Oct. 19, 1965  F. HANSBERG  3,212,141
SEAL FOR THE PRESSURE FRAME OF A CORE AND MOLD MAKING MACHINE
Filed March 21, 1963  7 Sheets-Sheet 1

INVENTOR
FRITZ HANSBERG
BY
ATTORNEYS

Oct. 19, 1965 F. HANSBERG 3,212,141
SEAL FOR THE PRESSURE FRAME OF A CORE AND MOLD MAKING MACHINE
Filed March 21, 1963 7 Sheets-Sheet 2

INVENTOR
FRITZ HANSBERG
BY Hanne and Nydick
ATTORNEYS

Oct. 19, 1965    F. HANSBERG    3,212,141
SEAL FOR THE PRESSURE FRAME OF A CORE AND MOLD MAKING MACHINE
Filed March 21, 1963    7 Sheets-Sheet 3
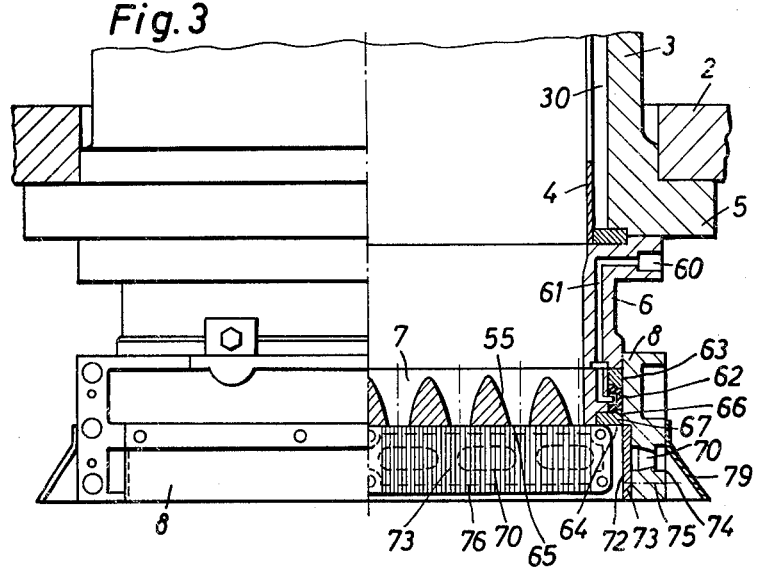
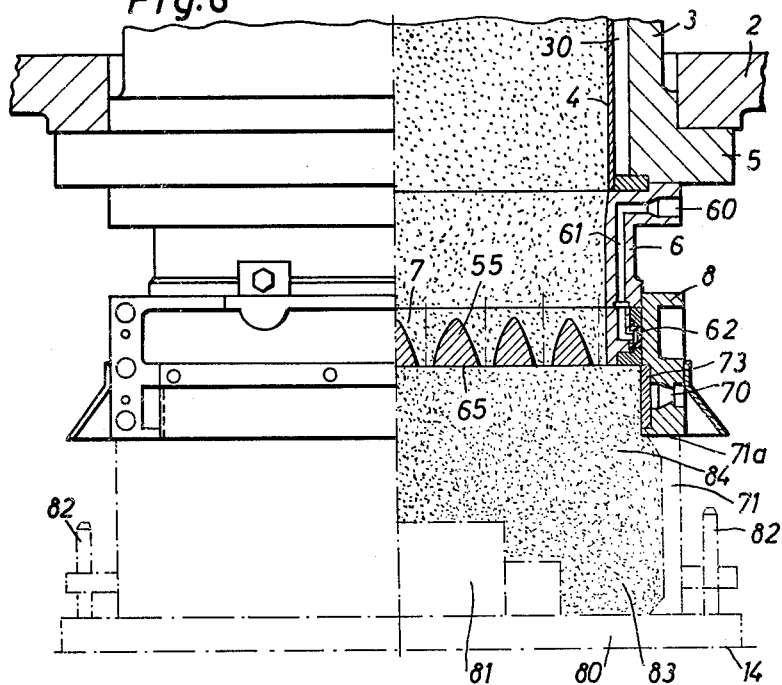
INVENTOR
FRITZ HANSBERG
BY
ATTORNEYS

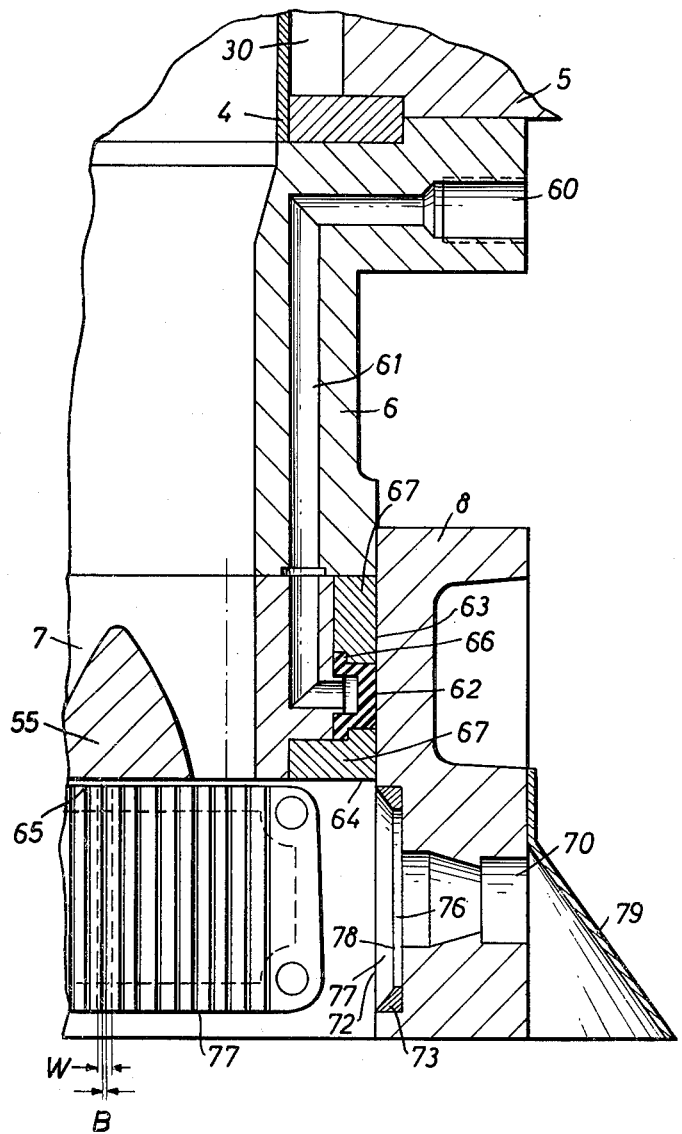

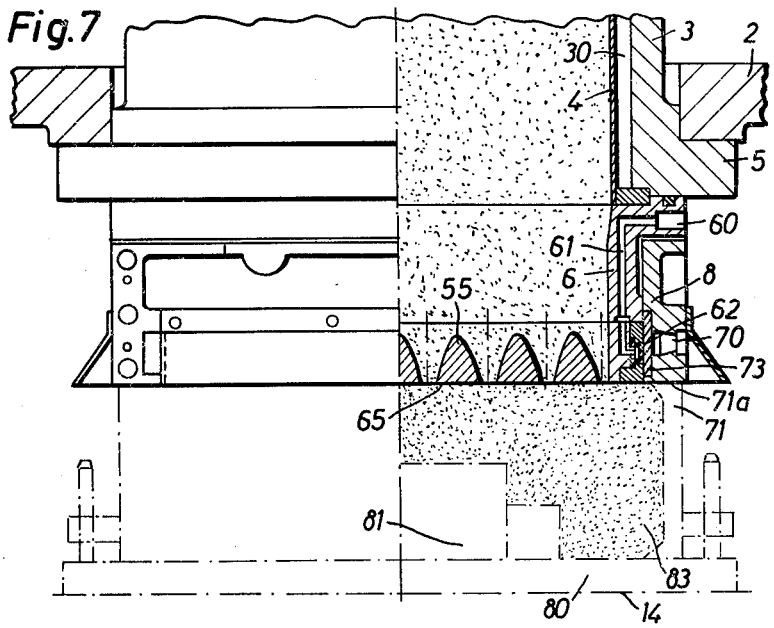

Oct. 19, 1965  F. HANSBERG  3,212,141
SEAL FOR THE PRESSURE FRAME OF A CORE AND MOLD MAKING MACHINE
Filed March 21, 1963  7 Sheets-Sheet 7

INVENTOR
FRITZ HANSBERG
BY Hane and Nydick
ATTORNEYS

United States Patent Office 3,212,141
Patented Oct. 19, 1965

3,212,141
SEAL FOR THE PRESSURE FRAME OF A CORE
AND MOLD MAKING MACHINE
Fritz Hansberg, Via Archirola 15, Modena, Italy
Filed Mar. 21, 1963, Ser. No. 266,851
Claims priority, application Italy, Mar. 23, 1962,
Patent 666,854
6 Claims. (Cl. 22—10)

The invention relates to a machine for investing mold boxes, etc. with molding material, and more particularly to a machine for investing core and mold boxes with molding material for the purpose of producing molds and cores as they are used in foundries.

There are known in practice machines in which the molding material such as molding sand is supplied to a supply container in the machine in which container pressure is built up by means of a pressure air control valve. The material is discharged from the supply container into the box to be invested. Various types of such mold and core making machines operating with pressure air are known. There are two basically different types of machines and modes of operation, to wit: the so-called true blowing machines in which a mixture of air and molding sand and is blown out and the so-called "shooting" machines in which the molding sand is abruptly forced into the box to be filled without previously mixing the molding sand with air. To state it differently, in one type of machine, the molding material is made flowable by mixing it with air, whereas in the other type machine, the material remains substantially compacted and is propelled out of the machine in the form of a substantially solid core, somewhat similar to the manner in which a pellet is shot out of an air rifle. Machines of the shooting type are more fully described in U.S. Patents 2,793,409 and 2,983,971.

The invention is particularly useful in connection with machines using the shooting principle.

To produce molds or cores with mold and core forming machines of the kind hereinbefore referred to, the molding material, such as sand, must be adequately compressed in the box in which it is invested. This is particularly of importance with the production of casting molds or cores as used in foundries. Depending upon the type of molding material which is used and the complexity of the molds or cores, the density and the hardness of the mold or core may not be sufficient when such molds or cores are produced by machines utilizing the blowing principle. In such event, it is customary to effect a supplementary or after pressing of the molding material subsequent to the investment of the box.

With mold and core making machines using the aforeexplained shooting principle, the density and the hardness of the cores and molds is usually so high that a supplemnetary or after pressing is not necessary. In fact, due to propelling the molding material into the box at a high and abrupt rate of movement, the density and the hardness of the obtained core or mold at the surfaces thereof defining the configuration of the object to be cast or otherwise formed may be so high that the core or mold is too hard for the casting operation and not sufficiently permeable to gas. However, in machines shooting out the molding material, the abrupt movement of the compacted material into the box may force the atmosphere air therein upwardly whereby air pockets are formed at the outer surfaces of the mold or core. Such pockets may result in a softness of the outer surface of the mold or core or such outer surface portions may even be loose. Such softness or loosening has no effect upon the quality of casts made from the mold or form, but a soft outer surface is undesirable for handling of the mold or core since when, for instance, the mold or core is turned over, part of the material in the outer layers may fall out. In such event, the base of a mold, for instance, the drag of a composite mold, does not rest flush of the supporting surface whereby the mold may sag by the weight of the cast metal and the gas pressure developing during the casting whereby the obtained casts will not be true to form. Furthermore, loose particles of the molding material at the outer surface of the mold may fall into the cavity of the mold when the same is turned or otherwise handled and cause flaws in the cast.

Accordingly, it is advisable in fully automatic mold or core forming plants to apply supplementary or after pressure to each box even though theoretically the application of such pressure is not necessary. The application of supplementary or after pressure is particularly advisable if the molding sand or other slurry material is not always of the same composition and the plant installation is designed for the production of cores or molds of different configurations requiring the use of differently shaped boxes.

A head assembly equipped with a supplementary or after pressure frame as hereinbefore described may either constitute part of the entire machine or an independently marketable device.

The frame for effecting supplementary pressure must be readily displaceable and it must also be so well sealed at the guide surfaces along which it is slidable that molding material which is expelled from the head, for instance, with a pressure of seven atmospheres into the box, cannot be partly forced out through the gaps between the frame and the guide surfaces therefor. It has been found that a frame which is so closely fitted in its guides that the very fine scorched sand particles usually contained in molding sand cannot penetrate through the gaps, tends to become jammed after some time, or at least cannot return fast enough into its lower position after investment of the sand or other slurry in the box.

It is a broad object of the invention to provide a shooting head either as part of a machine or as a separate unit in which the pressure frame may have more play in its guides and yet is fully sealed. Obviously a frame guided with such increased play is less likely to jam and will more readily move from one limit position into the other.

In addition to sealing off the play between the pressure frame and the guides therefor, the use of an air operated seal has the advantage that such seal is subjected to very little wear and tear and remains thus serviceable for a long period of time.

Other and further objects of the invention will be pointed out hereinafter and set forth in the appended claims constituting part of the invention.

In the accompanying drawing, several embodiments of the invention are shown by way of illustration and not by way of limitation.

FIG. 3 shows the lower part of FIG. 2 on a further enlarged scale, the left part of the figure showing the shooting head equipped with a pressure frame in elevational view and the right part of the figure showing the frame in section.

FIG. 4 is an enlarged fragmentary view of FIG. 3 showing the sealing means for the frame.

FIG. 6 shows the position of the shooting head according to FIG. 3 just after the completion of the expulsion of the molding material, but prior to the supplementary pressing.

FIG. 7 is similar to FIG. 6 but shows the operational stage subsequent to the supplementary pressing.

FIG. 8 is a modification, partly in elevational view and partly in section, of the supplementary pressing means, showing the operational stage subsequent to the investment of the box and prior to the supplementary pressing.

Figure 1:
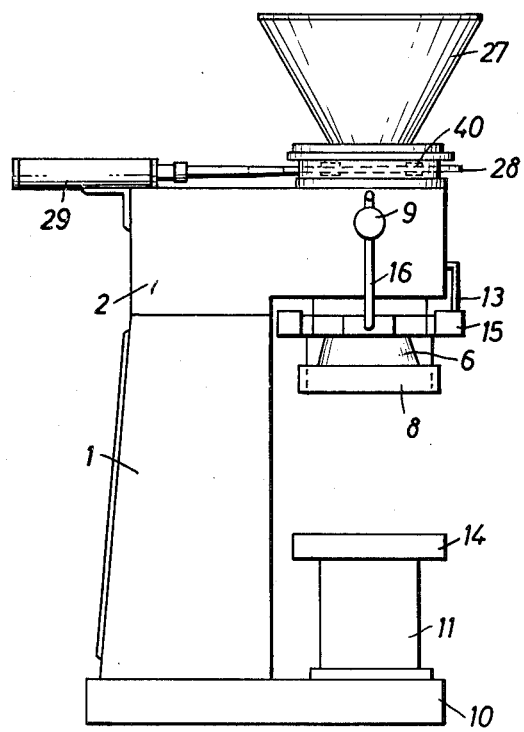
FIG. 1 is a diagrammatic elevational view of a shooting type machine equipped with means for supplementary or after pressing, according to the invention.

Referring first to FIG. 1 in detail, the machine shown in this figure is a core and mold making machine of the shooting type as previously described. The illustrated machine is a large type machine and equipped with means for supplementary or after pressing of the molding material to be invested in a box.

The exemplified machine comprises a base plate 10 which supports an upright frame 1 and a lifting cylinder 11 which serves to lift and lower a machine table 14 upon which is placed a box (not shown) to be invested. The head portion 2 of the machine is mounted on frame 1 and accommodates a storage chamber for the pressure air effecting the shot like ejection of the molding material, such as sand, and a sand supply container, as will be more fully described in conjunction with other figures. At the lower end of the sand container, the head portion 2 mounts the shooting head 6. The shooting head, in turn, supports a vertically displaceable frame 8 for supplementary or after pressing of the sand. The frame is locked in a predetermined vertical position in reference to the shooting head, or released from this position by means of four hydraulic cylinder-piston units 15 of conventional design which are controlled by a pneumatic automatic control device mounted in the head portion 2 and connected to cylinder-piston units by means of a conduit 13. An automatically controlled venting valve 9 of the machine is connected by a pressure air conduit 16 to sealing means for sealing supplementary pressing frame 8 at shooting head 6. A hopper 27 is mounted on top of head portion 2 and the supply of sand is fed from the hopper to the sand container in the machine under the control of a feed control slide 28. Slide 28 is guided on horizontal guide rolls 40 and may be moved into and out of a position closing discharge of sand from hopper 27 into the supply container in head portion 2 by means of a pressure air operated cylinder assembly 29 mounted on the frame or the head portion of the machine.

Figure 2:
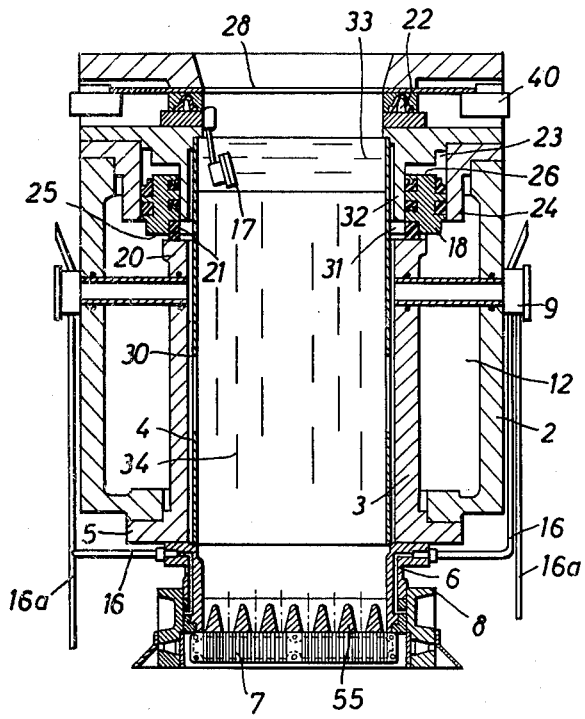
FIG. 2 is an elevational section through the head portion of the machine frame on an enlarged scale.

The head portion 2 is hollow and according to FIG. 2, a cylindrical supply container 3 for sand is inserted into head portion 2 from below. Container 3 is secured in position by means of a flange 5 and fastening means, such as bolts, extended through the flange. An annular chamber 12 defined in head portion 2 by container 3 serves as a storage chamber for the pressure air used to effect the abrupt or shot-like ejection of the sand from the machine and into the box to be invested. The storage chamber 12 for the pressure air is continued in head portion 2 as far as the wall of the frame structure 1. Supply container 3 is continued adjacent to the upper part of the annular chamber 12 by a ring-shaped partition wall 32 whereby an annular gap 31 is left between partition wall 32 and the upper edge of container 3. Wall 32 together with a cylinder 24 of somewhat larger diameter than wall 32 defines an annular cylindrical space 23 in which a ring valve 18 is vertically movable. Ring valve 18 is subjected at its upper surface 26 to control pressure air supplied to space 23 by a control air conduit (not shown) while the lower surface 25 of the valve is exposed to the pressure of the air used for ejection of the sand from the machine and stored in chamber 12. The lower surface 25 of valve 18 mounts a seal 21 with which the valve is seated upon the top end 20 of the supply container 3. As a result, the lower surface 25 of valve 18 is exposed to the pressure air stored in annular chamber 12 over a smaller area than the area which the upper surface 26 offers to the control pressure air contained in the annular space 23. Consequently, the pressure air in space 23 is capable of pressing the valve 18 strongly against the top end 20 of supply container 3 against the pressure of the pressure air stored in chamber 12, whereby the annular gap 31 is sealed against the interior of container 3. However, when space 23 is vented, the pressure air stored in annular chamber 12 forces valve 18 abruptly into its upper limit position and the pressure air can then flow from chamber 12 into the interior of container 3 through annular gap 31.

A perforated insert 4 is fitted in the interior of supply container 3. The insert defines between its outer wall and the inner wall of container 3 an annular space 30 into which pressure air from the storage chamber 12 can flow through ring gap 31 when valve 18 for controlling the expulsion of sand from the machine is actuated. The pressure air will then flow downwardly in space 30. Insert 4 has in its wall along nearly the entire height thereof a plurality of short vertical slits 34, the width of which may be a fraction of a millimeter. The upper end of insert 4 includes a plurality of short horizontal slits 33 which also have a width of a fraction of a millimeter.

As it is evident, the pressure air stored in annular chamber 12 for effecting expulsion of the sand, when flowing downwardly in space 30 upon opening of gap 31 by operation of valve 18, will penetrate through slits 34 into insert 4 and act upon the compacted sand therein in radial direction. In addition, the pressure air will enter the insert through the upper horizontal slits 33 and act upon the top side of the sand in insert 4 in axial direction. As a result of the radial action of the pressure air, the compacted mass or core of sand will be somewhat radially compressed so that it becomes free of the inner wall of insert 4 and is hence in effect momentarily floating, thus facilitating the shot-like expulsion of the sand from the machine. After the sand is expelled from the machine, container 3 is vented by means of the automatically controlled venting valves 9 disposed on opposite sides of head portion 2.

The automatic re-charging of supply container 3 is initiated by a diaphragm controlled valve 17 disposed within container 3. The valve controls the movement of feed control slide 28 closing and opening respectively the open top side of container 3 and is connected to a suitable automatic control system (not shown). The slide 28 is guided on horizontally disposed roller 40 and is sealed from below in its closing position by means of a pressure air seal 22.

The bottom end of container 3 mounts a shooting head 6. This shooting head, which may be fixedly or detachably mounted and serves to invest core or mold boxes with slurry, is provided with a grid shaped plate 55 including slot nozzles 7. The sand which is compacted in insert 4 of container 3 is driven through nozzles 7 into a box (not shown) placed on table 14.

Shooting head 6 is equipped with a vertically movable frame 8 for applying a supplementary or after pressure to the sand in the box. The vertical surfaces along which frame 8 is movable may be sealed by means of a pressure air seal which is connected by a pressure air conduit 16 either with venting valve 9 and thus with the pressure air control conduit 16a thereof (to the right in FIG. 2), or directly with the control air conduit 16a of venting valve 9, as is shown at the left side of FIG. 2.

According to FIGS. 3 and 4, the head portion 2 of the machine frame mounts, at the lower end of supply container 3, a shooting head 6 which, in this exemplification of the invention, is a head for investing core and mold boxes. Head 6 mounts a supplementary or after pressing frame 8 which can be locked by four releasable hydraulic piston-cylinder units 15 (FIG. 1) in a predetermined vertical position. Connectors 60 on the head are connected to conduits 16 to supply pressure air to the connectors under the control of venting valves 9 (FIG. 2). The connectors are continued by bores 61 which lead through pressure plate 55, including nozzle, to pressure air seal 62 for sealing frame 8 to supply pressure air to the seal. Seal 62 is disposed according to FIGS. 3 and 4 in the stationary guide surfaces 63 in head 6 at a level such that in the position of frame 8, in which the sand in container 3 is expelled, the seal is approximately at the level of the lower edge 64 of the pressure surface of plate 55. Since plate 55, which may be of any suitable configuration, reaches in the exemplification of FIGS. 3 and 4 to the outer edge of head 6, the seal 62 is disposed in the wall portion 63 of head 6, as previously pointed out.

The pressure seal 62 has lateral extensions 66 engaged by pressure rings 67 by means of which the seal is mounted airtight on a mounting surface. The outer surfaces of pressure rings 67 serve as guide surfaces and are hence preferably hardened.

Pressure air is supplied to seal 62 and the release of pressure air from the seal is controlled by venting valve 9 of container 3. The pressure seal is connected with valve 9 through pressure air conduits 16 and 16a respectively. It is fed with pressure air from valve 9 and is vented in a manner such that the seal is supplied with pressure air when valve 9 is closed and is vented when the valve is open (FIG. 2).

Frame 8 is provided with circumferentially distributed venting ports 70 through which the air can escape from box 71 when and while the box is invested with the slurry (FIG. 6). The escape ports 70 are so disposed in frame 8 that they are at least partly below the level of the pressure surface 65 of plate 55 of head 6 when the pressure frame is in the position for expelling the sand from container 3. The side 72 of frame 8 mounts large area filter strips 73, which filter air escaping from box 71 (FIG. 6) through venting ports 70. Strips 73 are secured by means of diagrammatically indicated screws 75 which penetrate into the filter strips from the outer side 74 of frame 8. An air collecting or distributing channel 76 is formed behind filter strips 73, as shown in FIG. 4. Channel 76 is shown shaded in FIG. 3 and serves to render the filter strips effective over the entire length thereof. Each filter strip has a plurality of small vertical slits 77 which may have a width $B$ in the order of 0.5 millimeter and are widened rearwardly to the back side 78 of the filter strip to approximately double the width $W$, that is, to a width of about 1 millimeter. The filter strips may be made of pressed-in sheet metal, such as brass sheet, and slits 77 are then milled into the sheet metal. However, the filter strips can also be made out of suitable synthetic plastics, such as polyamide or nylon, and they can be molded directly with filter slits. Ports 70 are shielded at the outside by air deflecting shields 79.

Figure 5:
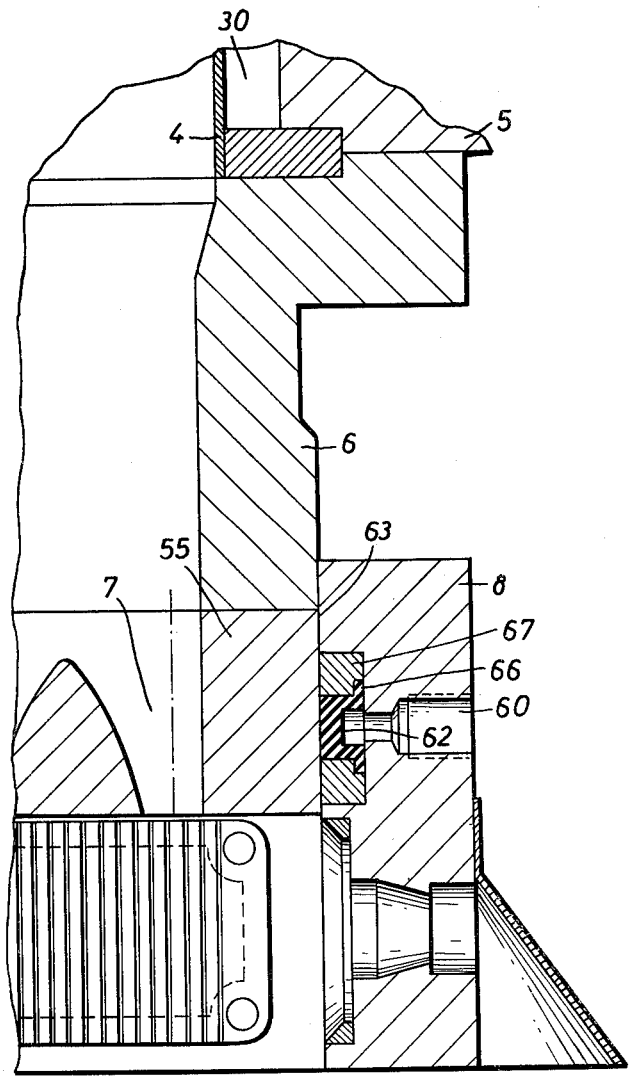
FIG. 5 is a sectional view similar to FIG. 4 but showing a modification of the sealing means.

According to FIG. 5, the pressure seal 62 is mounted in the guide surface 63 of frame 8. Such an arrangement has the advantage that the connection 60 for pressure air can be provided directly in frame 8 near seal 62 and air can be supplied directly through a flexible hose (not shown), for instance, from the venting valve of the machine. Seal 62 is provided in this embodiment also with lateral extensions 66. These extensions are engaged by pressure rings 67 for securing the seal airtight to a mounting surface.

FIG. 6 shows the operation of the shooting head 6 of FIGS. 3 and 4 at the moment following the expulsion of the sand from container 3, but prior to the supplementary pressing. The figure also shows, in dotted lines, a pattern plate 80 resting upon the machine table 14 and supporting a pattern 81. Box 71 is placed upon pattern plate 80 and centered thereon by pins 82. When now table 14 is raised, box 71 is pressed against frame 8 which at this stage of the operations is locked by hydraulic piston-cylinder units 15 in its lowered vertical position and hence resists the pressure of table 14. As it is evident, frame 8 enlarges in effect the available capacity of box 71 by an increment of height utilized for the subsequent supplementary pressing operation. The height by which boxes is so enlarged can be selected in accordance with the requirements of a specific application. When now box 71 is invested with the sand, an overflow amount of sand 84 is formed above the normal investment level 83 of the box. This overflow is available for the subsequent supplementary pressing. The air entrapped by the substantially compact sand propelled into box 71 is forced upwardly and can escape into the atmosphere through ports 70, whereby filter strips 73 filter out any sand particles that may be entrained in the escaping air. During the propulsion of the sand into the box, seal 62 is supplied with pressure air through connector 60 in head 6 and valve 9 which, during this period of time, is also under pressure and hence closed. Accordingly, the seal is activated and seals frame 8 as previously described.

As is shown in FIG. 7, opening of valve 9 (FIG. 2) effects venting of seal 62 and release of frame 8, the frame being released by venting the four hydraulic piston-cylinder units. Lifting cylinder 11 is at this moment still under pressure and lifts table 14 together with pattern plate 80 and box 71, and also the now released pressure frame 8 which rests upon the upper edge 71a of box 71. During such upward movement of table 14 and the components supported thereon, the pressure surface 65 of plate 55 is compressing the previously protruding overflow 84 of the sand to the level of the upper edge 71a of box 71, or in other words, the outer surface of the mold has now been subjected to the desired supplementary pressing.

FIG. 8 shows an arrangement in which the sand in the box is compressed by the supplementary pressure not to the level of the upper edge of box 71 but below that level. More specifically, FIG. 8 shows the operation just after the expulsion of the sand from the machine and before the supplementary pressing. The supplementary pressing surface 65 of plate 55 is initially at the level of the upper edge of 71a of box 71. To permit a free escape of the air entrapped in box 71 through ports 70 upon investment of the sand, plate 55 is upwardly slanted along its periphery. At the moment of the expulsion of the sand, frame 8 is locked by piston-cylinder units 15 whereby simultaneously pressure air is applied to seal 62 as previously described.

Figure 9:
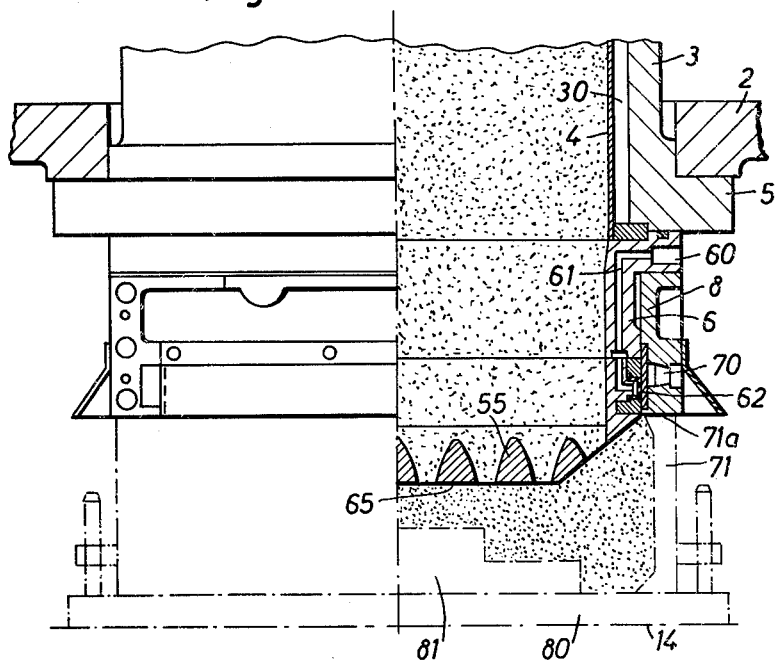
FIG. 9 is similar to FIG. 8 but showing the operational stage subsequent to the supplementary pressing effecting compression of the molding material below the upper rim of the box, and FIG. 10 corresponds to FIG. 3, except that the shooting head which is shown with a frame for supplementary or after pressing, is designed to be exchangeably mounted in a machine also accepting standard heads.

FIG. 9 corresponds to FIG. 8 and shows the operational stage after supplementary pressing. When seal 62 is released and frame 8 is also freed, cylinder 11 lifts pattern plate 80 and box 71 thereon and also the now released frame 8 resting upon the upper edge 71a of box 71. As a result, plate 55 presses upon sand 83 and forces the same below edge 70a. As it is evident, such depression of the sand below the level of the box results in the same increase of the density of the sand as does a depression of an initially overfilled box to the level of the upper edge of the box. Supplementary pressing of the sand below the level of the box is particularly advantageous for the cope of a composite mold, especially when pattern 81 protrudes into the cope with a flat surface, and it is desirable to save sand.

Figure 10:
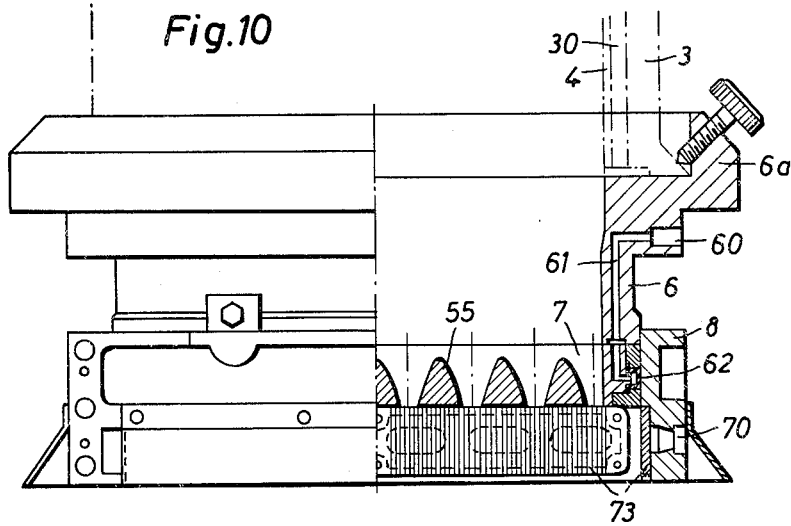

FIG. 10 shows a shooting head 6 equipped with a frame 8 as previously described. The head is provided with fastening means 6a which may be of the type conventionally used for heads of the kind here involved. The head according to FIG. 10 can be secured to the head portion of the machine frame in alignment with the lower end of container 3 in the same manner as the standard head. Such an arrangement affords the advantage that a head 6 according to the invention constitutes a marketable and self-contained unit as such which can be marketed in the same manner as standard heads and which can also be used in machines equipped for use with standard heads. The arrangement of frame 8, seal 62, filter strips 73 and control of the supply of pressure air to the frame and the seal are as described in connection with FIGS. 3 and the machine of FIG. 1.

The operation of the head according to FIG. 10 is evident from the previous description. The head operates in the manner described in connection with FIGS. 6 and 7, but it may also be arranged to operate in the manner of the head described in connection with FIGS. 8 and 9.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A discharge and pressure head assembly for a core and mold-making machine in which molding material contained in a supply container in the machine is forced by abrupt application of pressure air through said head assembly into a box to be invested with the material, said head assembly comprising a head portion including an apertured pressure plate for discharging the material therethrough and applying pressure to the material filled in a box to compress the material therein, a support table for a box to be invested with molding material, said table being movable in reference to said pressure plate, pressure air conduit means for supplying air pressure to said table to move the latter toward said pressure plate to compress material in a box on said table, a pressure frame encompassing the peripheral outline of said head portion and displaceable up and down in reference to the same in slidable engagement therewith for applying supplemental pressure to the material in said box, air pressure operated expandable sealing means interposed between said head portion and said frame, means for supplying said sealing means with pressure air for sealing the frame against the head portion, said sealing means breaking said seal when the supply of pressure air to the sealing means is discontinued, locking means coacting with said frame to lock the same in a position extending axially beyond the discharge side of said pressure plate for seating the frame on the top rim of the box during discharge of the material through said pressure plate to build up the material in the box above said rim, said locking means releasing said frame for displacement into a non-protruding position upon completion of the discharge of material to permit compression of the built-up material by said pressure plate, said conduit means including conduits connected to said table for supplying pressure air to the same to lift the table toward said pressure plate and supplying pressure air to said sealing means, and air pressure control means for controlling the flow of pressure air through said conduit means, said control means including valve means to open the flow of pressure air to the table and close the flow of pressure air to the sealing means to cause said sealing means to break the seal when and while said tables moves toward said pressure plate, and to open the flow of pressure air to said sealing means when said table is stationary.

2. A head assembly according to claim 1, wherein said sealing means are maintained at a level such that in the locked position of the frame said sealing means are approximately level with the discharge side of said pressure plate.

3. A head assembly according to claim 2 wherein said sealing means are mounted in a wall of said head portion in slidable engagement with said frame.

4. A head assembly according to claim 3 wherein said sealing means are mounted in a peripheral side wall of said pressure plate.

5. A head assembly according to claim 2 wherein said sealing means are mounted in a wall of said head portion in slidable engagement with said frame, said wall including pressure air supply ducts leading to said sealing means.

6. A head assembly according to claim 1 wherein said sealing means are mounted on said pressure frame.

References Cited by the Examiner

UNITED STATES PATENTS

| 2,240,049 | 4/29 | Murphy | 22—10 |
| 2,598,621 | 5/52 | Taccone | 22—10 |
| 2,654,924 | 10/53 | Wood et al. | 22—10 |
| 2,665,461 | 1/54 | Rodgers | 22—10 |
| 2,779,071 | 1/57 | Herbruggen | 22—10 |
| 2,839,799 | 6/58 | Herbruggen | 22—36 |
| 3,089,207 | 5/63 | Miller | 22—10 |

MARCUS U. LYONS, *Primary Examiner.*

WILLIAM J. STEPHENSON, *Examiner.*